Figure 1:
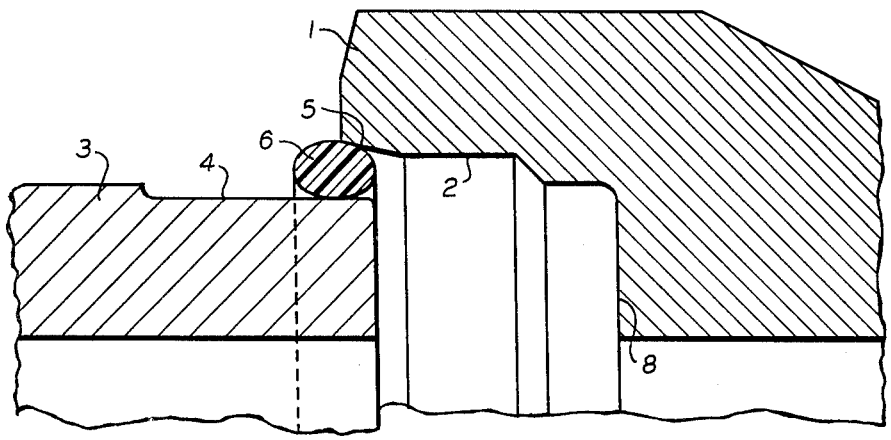

INVENTOR
OVE CARL GUNNAR LARKFELDT

United States Patent Office 3,257,719
Patented June 28, 1966

3,257,719
METHOD OF FORMING A PACKING JOINT BETWEEN TWO PIPE SECTIONS
Ove Carl Gunnar Larkfeldt, Stockholm, Sweden, assignor to A. B. Skanska Cementgjuteriet, Stockholm, Sweden, a corporation of Sweden
Continuation of application Ser. No. 409,549, Nov. 6, 1964, which is a continuation of application Ser. No. 78,443, Dec. 27, 1960. This application July 22, 1965, Ser. No. 477,633
4 Claims. (Cl. 29—451)

This application is a continuation of my pending application, Serial No. 409,549, filed November 6, 1964, now abandoned, which, in turn, was a continuation of my co-pending application, Serial No. 78,443, filed December 27, 1960, and now abandoned.

This invention relates to a method of assembling a gasket between two pipe sections, comprising a gasket ring which consists of an elastic material and in a deformed state is placed between substantially cylindrical or slightly conical sealing surfaces at the ends of the two pipe sections, one of which ends is insertable into the other one. The gasket ring is adapted to be put on the inner pipe end while being elastically stretched and to roll along the sealing surfaces as the inner pipe end is inserted to the adjoining position within the outer pipe end.

It is known to use for this purpose a rubber ring which is circular in cross-section. It has proved, however, that with such conventional gasket ring the packing joint is often unsatisfactory which has proved to be mainly due to the fact that the ring, while rolling along the sealing surfaces during assembly, frequently places itself in a plane lying obliquely with respect to the axes of the pipe sections or assumes a skew form. Now, it has turned out that the primary reason for the above named condition is the fact that it is practically almost impossible to have the gasket ring placed correctly on the smaller pipe end onto which the ring is to be put before this pipe end is inserted into the meeting outer pipe end. The diameter of the undeformed gasket ring must be smaller than the diameter of the pipe end onto which the ring is to be placed. Consequently, the ring must be stretched while being put onto the pipe end, and during this operation the ring is likely to twist itself about the centre of the cross-section. This twisting movement is different at different parts of the ring, for instance at diametrically opposite parts. When during the subsequent assembly of the pipe ends the gasket ring rolls along the sealing surfaces, the various cross sections of the ring will remain in their mutually twisted positions, resulting in corresponding irregularities in the rolling movement and in the final position of the ring.

This inconvenience is eliminated by the invention due to the fact that the cross-section of the ring shall be of substantially oval form, and enables the ring to resist the unintentional twisting movement to which a circular cross-section is subjected. The worker can directly feel that the ring is put on in the correct position, and the ring itself tends to place the longitudinal axes of all of its cross-sections in one and the same direction. It is particularly the fact that the material of the ring itself tends to assume a certain direction under the influence of forces acting in each marked cross-section, which causes an accurate rolling movement along the sealing surfaces. For a given degree of compression of the material, the oval cross-section provides a much greater area of contact with the sealing surfaces as compared with a gasket ring with originally circular cross-section. Further, a ring with a cross-sectional shape in accordance with the invention exerts an increased resistance to rolling if the major axis of the cross section is substantially parallel to the axis of the pipe sections. In its sealing position, the ring consquently exerts a marked resistance to separation of the pipe sections.

The invention is described more closely hereinbelow with reference to an embodiment thereof illustrated in the annexed drawing.

Figure 2:
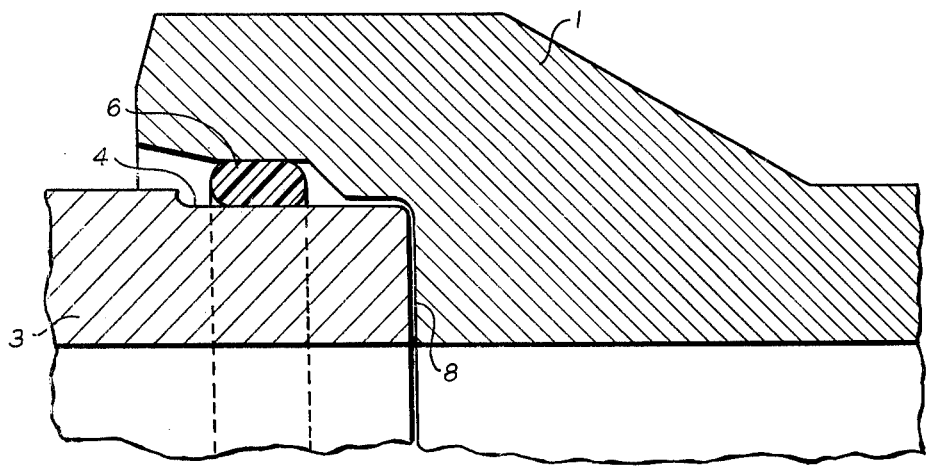

FIG. 1 is a sectional view of the ends of two pipe sections to be joined to each other, and FIG. 2 is a similar sectional view showing the pipe sections joined together.

The drawing illustrates a type of socket pipe in which the socket portion 1 provided at one end of the pipe has a substantially cylindrical sealing surface 2, whereas the meeting pipe has a smaller spigot portion 3 with a substantially cylindrical sealing surface 4. In FIG. 1, a gasket ring 6 of an elastic material, such as rubber or the like, is put on, or forced on, the outer part of the sealing surface 4. In undeformed state, the gasket ring 6 has a substantially elliptical cross-sectional form. The major axis of the cross-section is substantially parallel to the central axis of the ring. The smallest dimension of the cross-section of the ring is greater than the clearance between the surfaces 2 and 4. Further, the form of the cross-section of the ring is such that upon relative longitudinal displacement of the surfaces 2 and 4 the ring will roll along these surfaces due to its frictional engagement therewith.

FIG. 2 illustrates the relative positions of the ring and the pipe ends after the front end of the pipe 3 has come into contact with the abutment which is formed by the inner shoulder 8 of the socket end of the opposite pipe. The dimensions of the parts are such that the cross-section of the gasket ring during the rolling movement has turned through an angle of about 180°. If the gasket ring has not turned completely through an angle of 180° when the spigot portion comes into contact with the shoulder 8, the ring tends to keep the spigot portion in contact with the shoulder 8, this being due to the fact that the major axes of the cross-sections of the ring have a tendency to adjust themselves into positions parallel to the axis of the pipe. In its final position, the ring 6 has a great surface area in contact with the two sealing surfaces 2 and 4. This contact surface is greater than in the case of a ring which normally is circular in cross-section, on the assumption that in both cases the elastic material is compressed to the maximum degree which is practically permissible or suitable.

The ratio of the smallest to the greatest dimension of the cross-section of the ring as well as the contour of the cross-section must be such as to ensure actual rolling movement of the ring upon relative displacement of the surfaces 2 and 4. The ratio of the smallest to the greatest dimension (minor axis to major axis) may be between 1:2 and 1:1.1 or 1:1.15, for instance between 1:2 and 1:1.2. In each of these examples, the ratio 1:2 may be changed to 1:1.9 or 1:1.8 or 1:1.7 or 1:1.6 or 1:1.5 etc.

The cross-section of the ring need not be exactly oval in the sense that the outline is formed merely by curved lines. The contour may be formed by straight lines or straight and curved lines, but such that the principal impression will be an oval form and that the ring can roll along the sealing surfaces 2, 4. On the other hand, the ring must not have plane sides which would cause sliding movement rather than rolling movement between the ring and the sealing surfaces.

In order to have the gasket ring 6 assume the desired final position after assembly of the pipes, the sealing surfaces 2, 4 and the shoulder 8 and the ring are suitably positioned and dimensioned such that the cross-section of the ring during assembly will turn through an angle of about 180° or a multiple of 180°.

In undeformed state the diameter of the gasket ring is advantageously much smaller than the diameter of the sealing surface 4 so that the ring has to be stretched when being placed onto the surface 4.

The sealing surface 2 of the socket portion merges directly into a slightly conically diverging mouth surface 5 having so slight an inclination as to ensure rolling movement of the gasket ring at this place without axial sliding movement on the sealing surface 4.

The packing joint is particularly advantageous in connection with concrete pipes and can be used even for pipes of large diameter, such as internal diameters of more than 4 inches and up to 40 inches or even more. The smallest cross-sectional dimension of the gasket ring in the undeformed state should be less than one tenth of the diameter of the internal sealing surface 2. The pipes need not be socket pipes. For instance, they may have throughout the same external diameter except that one pipe end is tapering so as to able to enter a corresponding recess in the meeting pipe end.

In the example illustrated in FIG. 1, the major axis of the cross-section of the ring is parallel to the central axis of the ring. Alternatively, the major axis of the cross-section of the ring may make an angle with said central axis. The turning angle of the cross-section of the ring during assembly of the pipe sections to the final position may be other than 180° or a multiple thereof.

What I claim is:

1. The method of forming a packing joint between a pair of telescoping pipe sections wherein the outer of said sections has a substantially cylindrical ungrooved inner surface adjacent to an end thereof and the inner of said sections has a substantially cylindrical ungrooved outer surface adjacent to an end thereof, said outer cylindrical surface being of smaller diameter than said inner cylindrical surface to provide a clearance between said surfaces, said method comprising: placing around said outer cylindrical surface adjacent to the free end thereof a stretched ring of elastic material having, in the unstretched condition, a substantially oval cross-section whose inner circumference is normally less than the outer circumference of said outer cylindrical surface and whose short axis is longer than said clearance; placing the free end of said inner cylindrical surface in contact with said stretched elastic ring; and effecting a telescoping movement of said sections whereby the elastic ring is rolled through an angle of at least 90 degrees between said surfaces and then brought to rest with the long axis of its said oval cross-section substantially parallel to the longitudinal axis of said cylindrical surfaces so that it resists separation of the telescoped sections.

2. A method according to claim 1 wherein: said stretched ring of elastic material is placed around the outer cylindrical surface of the inner pipe section in such manner that the long axis of its cross-section is substantially parallel to the longitudinal axis of said outer cylindrical surface and said long axis is then rotated through an angle of about 180°.

3. A method according to claim 1 wherein: the ratio of the dimensions of the long axis and the short axis of said substantially oval cross-section is between 1:2 and 1:1.1.

4. A method according to claim 1 wherein: the ratio of the dimensions of the long axis and the short axis of said substantially oval cross-section is between 1:1.7 and 1:1.15.

References Cited by the Examiner
UNITED STATES PATENTS

| | | | |
|---|---|---|---|
| 1,985,899 | 1/1935 | Jahn | 285—347 X |
| 2,272,115 | 2/1942 | Halkyard | 285—347 X |
| 2,365,574 | 12/1944 | McWane. | |

CHARLIE T. MOON, *Primary Examiner.*